MATRIX TYPE DECODING CIRCUIT FOR BINARY CODE SIGNALS

Filed July 13, 1953

CODE

| DECIMAL NUMBER | BINARY NUMBER $D_5$ | $D_4$ | $D_3$ | $D_2$ | $D_1$ |
|---|---|---|---|---|---|
| 1 | 0 | 0 | 0 | 0 | 0 |
| 2 | 0 | 0 | 0 | 0 | 1 |
| 3 | 0 | 0 | 0 | 1 | 1 |
| 4 | 0 | 0 | 0 | 1 | 0 |
| 5 | 0 | 0 | 1 | 1 | 0 |
| 6 | 0 | 0 | 1 | 1 | 1 |
| 7 | 0 | 0 | 1 | 0 | 1 |
| 8 | 0 | 0 | 1 | 0 | 0 |
| 9 | 0 | 1 | 1 | 0 | 0 |
| 10 | 0 | 1 | 1 | 0 | 1 |
| 11 | 0 | 1 | 1 | 1 | 1 |
| 12 | 0 | 1 | 1 | 1 | 0 |
| 13 | 0 | 1 | 0 | 1 | 0 |
| 14 | 0 | 1 | 0 | 1 | 1 |
| 15 | 0 | 1 | 0 | 0 | 1 |
| 16 | 0 | 1 | 0 | 0 | 0 |
| 17 | 1 | 1 | 0 | 0 | 0 |
| 18 | 1 | 1 | 0 | 0 | 1 |
| 19 | 1 | 1 | 0 | 1 | 1 |
| 20 | 1 | 1 | 0 | 1 | 0 |
| 21 | 1 | 1 | 1 | 1 | 0 |
| 22 | 1 | 1 | 1 | 1 | 1 |
| 23 | 1 | 1 | 1 | 0 | 1 |
| 24 | 1 | 1 | 1 | 0 | 0 |
| 25 | 1 | 0 | 1 | 0 | 0 |
| 26 | 1 | 0 | 1 | 0 | 1 |
| 27 | 1 | 0 | 1 | 1 | 1 |
| 28 | 1 | 0 | 1 | 1 | 0 |
| 29 | 1 | 0 | 0 | 1 | 0 |
| 30 | 1 | 0 | 0 | 1 | 1 |
| 31 | 1 | 0 | 0 | 0 | 1 |
| 32 | 1 | 0 | 0 | 0 | 0 |

INVENTOR.
H. B. Schultheis Jr.
BY
[signature]
ATTORNEY 2,769,968

MATRIX TYPE DECODING CIRCUIT FOR BINARY CODE SIGNALS

Harry B. Schultheis, Jr., Reseda, Calif., assignor to Bendix Aviation Corporation, North Hollywood, Calif., a corporation of Delaware Application July 13, 1953, Serial No. 367,554

1 Claim. (Cl. 340—166)

Figures 1, 2:
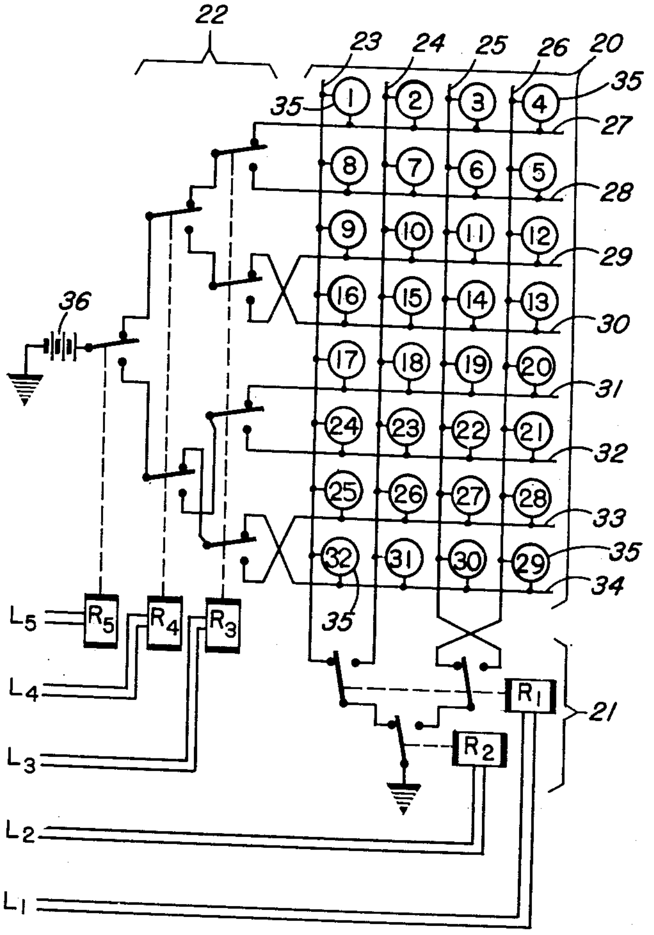

This invention relates to decoding apparatus responsive to multi-digit binary code electrical signals for indicating the decimal number or other symbol represented by each multidigit binary number.

An object of the invention is to provide a relatively simple and inexpensive decoding apparatus for signals of the type described.

A feature of the invention is a decoding apparatus that inherently responds to signals of the reflected binary code to display the decimal numbers corresponding thereto in an orderly pattern on a display panel.

Other more specific objects and features will appear from the description to follow.

The present invention utilizes a matrix circuit in combination with transfer tree circuits to obtain the desired results. Transfer tree circuits per se are old, but when used with a matrix circuit the combination has unexpected advantages in decoding binary signals. These advantages are a great reduction in the number of contacts required on the tree circuit relays, and an orderly arrangement of the output connections of the matrix circuit relative to the decoded numbers.

A full understanding of the invention may be had from the following detailed description with reference to the drawing.

In the drawing:

Fig. 1 is a schematic circuit diagram of a system in accordance with the invention; and Fig. 2 is a table showing an example of the reflected binary code for which the system is designed.

Referring to Fig. 1, a decoding indicator in accordance with the invention comprises: a matrix circuit 20; and first and second transfer tree circuits 21 and 22, respectively, through which the matrix circuit is energized.

The system shown is adapted to handle a five-digit binary code, which has a capacity of 32 decimal numbers, or other output indications as shown in Fig. 2. There are therefore five digit relays $R_1$, $R_2$, $R_3$, $R_4$ and $R_5$ connected to respective input lines $L_1$, $L_2$, $L_3$, $L_4$ and $L_5$, over which the respective digit signals of a five-digit binary code are separately received.

Relays $R_1$ and $R_2$, associated with the lower digits of the code, are herein identified as the "first group" of relays, and relays $R_3$, $R_4$ and $R_5$, associated with the higher digits, are herein identified as the "second group" of relays. In the five-digit system of Fig. 1 the "lower" digits are digits D1 and D2 (Fig. 2), and the "higher" digits are digits D3, D4 and D5. However, regradless of the number of digits in the code employed, the expression "lower digits" as used herein means a "first" group of digits of less significance than all the rest, and all the rest of the digits are referred to as the "higher digits" or as the "second" group of digits. The expression "transfer tree circuit" is old in the art, and means a multiple subdividing circuit in which a single conductor is connectible by a transfer switch to either of two conductors each of which in turn is connectible by a separate transfer switch to either of two new conductors, and so on, there being one set of transfer contacts in the lowest stage or tier of the tree, and each higher tier having twice as many sets of transfer contacts as the tier there below.

Relay $R_1$ has two sets of transfer contacts in the highest tier of the first transfer tree 21, and relay $R_2$ has one set of transfer contacts in the next lower (in this case, the lowest) tier of transfer tree 21. Relay $R_3$ has four sets of transfer contacts in the highest tier of the second transfer tree 22, relay $R_4$ has two sets of transfer contacts in the next lower tier, and relay $R_5$ has one set of transfer contacts in the lowest tier of the second transfer tree 22.

The matrix circuit 20 comprises a first group of four busses 23, 24, 25 and 26 associated with the first transfer tree 21 and a second group of eight busses, 27 through 34, associated with the second transfer tree 22. Each bus of group 1 is paired with each bus of group 2, forming a total of thirty-two pairs, since the number of possible pairs is the product of the number of busses in the two groups. A separate electrical indicator 35 is connected between each different pair of first and second group busses, and is responsive to potential therebetween. The indicators 35 may be relays, drops, or lamps, as in any matrix circuit.

The tree circuits 21 and 22 function to connect a potential source 36, here shown as a battery, across different pairs of first and second group busses according to the binary signals received over the five digit lines $L_1$, $L_2$, $L_3$, $L_4$, $L_5$. Thus one terminal of source 36 is directly connected to the lowest tier movable contact of transfer tree 22, and the other terminal is connected (through ground) to the movable contact of the lowest tier movable contact of transfer tree 21.

By tracing the tree circuits that are completed in response to the code shown in Fig. 2, it will be observed that the decimal numbers corresponding to the different binary numbers will be related to the indicators 35 as shown by the numbers on the indicators in Fig. 1. Of course it will be understood that Fig. 1 merely shows how the indicators must be connected to the busses of the matrix circuit. The indicators themselves can be positioned in any desired pattern and do not have to be located physically adjacent to the points of intersection of the busses between which they are electrically connected, although it is usually desirable to so locate them, as it simplifies construction and reduces the cost.

An important feature of the invention is that it provides a very simple system for decoding the "reflected binary code" shown in Fig. 2. This code is also referred to as the "minimum error binary code," so named because only one digit changes between any two successive numbers.

Thus it will be observed that with all the relays in normal position corresponding to the code of the decimal number "1," battery is connected to the topmost bus 27, and ground is connected to the leftmost bus 23, thereby energizing the leftmost indicator 35 in the top row.

The reflected binary code for the decimal number "2" energizes relay $R_1$ only, thereby transferring the ground connection from the bus 23 to the bus 24 and energizing the second indicator from the left in the top row.

The code for the decimal number "3" additionally energizes relay $R_2$ to transfer the ground connection from the left contact set of relay $R_1$ to the right set, and (since relay $R_1$ is still energized) thereby transferring the ground connection to the bus 25 to energize the third indicator from the left in the top row.

The code for the decimal number "4" de-energizes relay $R_1$ to transfer the ground from bus 25 to bus 26 and energizes the rightmost indicator in the top row.

It will be observed that by transposing the output connections from the transfer tree 21 to the busses 25 and 26, the shift between the decimal numbers "2" and "3"

is made by merely energizing the relay $R_2$. Without the transposed connection, the relay $R_1$ would have to be de-energized simultaneously with the energization of relay $R_2$ (two relay operations) to effect the change between the consecutive decimal numbers "2" and "3." This is an important feature of the invention.

It is to be noted that transposition can be effected in other ways than cross-connecting the conductors, as by causing the associated contact to move in the opposite direction. The present invention is not in any particular way of effecting transposition, but in the use of transposition (no matter how attained) at certain points in the system to produce a new result.

The code for the decimal number "5" energizes relay $R_3$ for the first time, thereby transferring the battery connection from bus 27 to bus 28, and it will be observed (from Fig. 2) that relay $R_3$ remains energized for all the decimal numbers "5" to "12" inclusive. The relay $R_2$ was energized, and the relay $R_1$ was de-energized for the decimal number "4," and these relays are in the same position for the decimal number "5." Therefore, the actuation of relay $R_3$ energizes the rightmost indicator in the second row from the top.

Consecutive applications of the codes for the decimal numbers "6," "7" and "8" successively energize the relay $R_1$, de-energize the relay $R_2$ and then the relay $R_1$ to indicate those decimal numbers in reverse order; i. e. in right-to-left, in the second row, as shown in Fig. 1.

The only change in the relays to shift from the decimal number "8" to the decimal number "9" is the energization of relay $R_4$. At this time the relay $R_3$ is already energized, so that battery is transferred from the bus 28 to the bus 29, and, since relays $R_1$ and $R_2$ are de-energized, the leftmost indicator in the third row from the top is energized. It will be noted here that the connections of the busses 29 and 30 to their associated contacts in the transfer tree 22 are transposed. This enables the shift from the decimal number "8" to the decimal number "9" solely by the energization of relay $R_4$. On the other hand, if the connections of busses 29 and 30 were not transposed, the relay $R_4$ would have to be energized and the relay $R_3$ simultaneously de-energized to effect the shift between the decimal numbers "8" and "9."

The connections for the remaining numbers can be readily traced.

It will be observed from inspection of Fig. 1 that in any tier of transfer tree 21 or 22 containing more than one set of transfer contacts the output connections to alternate sets are transposed. Thus in tree 21 the connections to busses 25 and 26 are transposed, and in tree 22 the output connections to busses 29, 30 and to busses 33, 34 are transposed. Likewise, in the next highest tier of tree 22 the output connections to the lower contact set of relay $R_4$ are transposed. It is found that this rule of transposition holds for systems for decoding binary numbers of any number of digits and is essential to the orderly display of reflected binary code signals. It is a valuable feature of the invention.

The invention is of course not limited to five-digit codes, but is applicable to codes of any number of digits.

It will be apparent that there must be as many digit relays R as there are digits in the code. These relays must be arranged in a first group associated with the first group of (lower) digits and a second group associated with the second group of (higer) digits, the first and second groups of relays being respectively associated with the first and second transfer trees. It will be apparent that each transfer tree will have as many tiers as there are relays, and that each additional tier will contain twice as many sets of transfer contacts as the next lower tier. Hence if the lower digits are $x$ in number and there are $x$ relays in the first group, and the higher digits are $y$ in number and there are $y$ relays in the second groups, there will be $2^x$ busses in the first group and $2^y$ busses in the second group. Since the number of indicators 31 equals the product of the number of busses in the first and second groups respectively, the total number of indicators is $2^x2^y$ or $2^{(x+y)}$. Since $x+y$ represents the total number of digits in the binary code, the number of indicators that corresponds with the total number of different values that can be represented by the code, it being well recognized that a binary code of $z$ digits has $2^z$ different combinations.

It is desirable but not essential that both groups of matrix busses be equal in number, and obviously this is not possible with a binary code having an odd number of digits. However, it is desirable to make them as nearly equal as possible, to keep the number of tiers in each transfer tree as low as possible, because the number of relay contacts doubles in each successive tier in the transfer tree. The practical factor limiting the number of digits that can be handled is the number of contacts that can be operated by one relay.

Although for the purpose of explaining the invention, a particular embodiment thereof has been shown and described, obvious modifications will occur to a person skilled in the art, and I do not desire to be limited to the exact details shown and described.

I claim:

Apparatus for decoding multidigit reflected binary code signals of $z$ digits comprising: a plurality of two-position digit relays, one for each digit of the code, each adapted to be actuated by a separate digit signal of said code and having one or more sets of transfer contacts, said relays being constituted by a first group of $x$ relays associated with the lower digits of the code and a second group of $y$ relays associated with the higher digits of the code; a matrix circuit comprising a first group of busses $2^x$ in number, a second group of busses $2^y$ in number and $2^x2^y$ electrical indicators each responsive to potential between a different pair of first and second group busses; a source of potential; means connecting the contacts of said first group of $x$ relays in a first tree circuit between one terminal of said source and all the busses of said first group; means connecting the contacts of said second group of $y$ relays in a tree circuit between the other terminal of said source and all the busses of said second group; each tree circuit having as many tiers as tere are relays in its associated group and the lowest tier relay in each group having one transfer contact set, and each other relay having twice as many independent transfer contact sets as the next lower tier relay; the lowest digit relay in each group being in the highest tier in the associated tree circuit and successively higher digit relays being in successively lower tiers of the tree circuit, and each tier of said tree circuits containing more than one set of transfer contacts having its output connections to alternate sets of transfer contacts transposed.

References Cited in the file of this patent

UNITED STATES PATENTS

| | | |
|---|---|---|
| 1,547,964 | Semat | July 28, 1925 |
| 1,917,294 | Carr | July 11, 1933 |
| 2,342,886 | Murphy | Feb. 29, 1944 |